Sept. 6, 1966  P. T. WOODBERRY  3,271,119
FOAMED PLASTIC STRUCTURE HAVING A UNIFORM CONTINUOUS METAL
COATING INTEGRALLY BONDED TO THE SURFACE THEREOF
Filed March 13, 1964
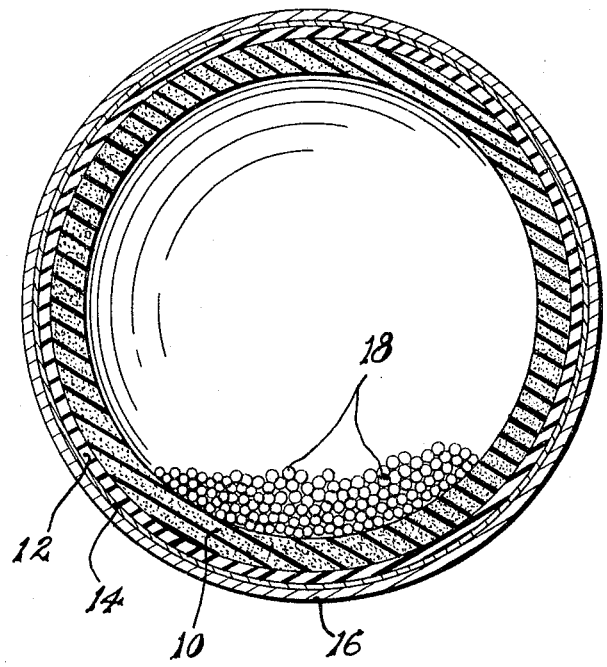
INVENTOR.
PAUL T. WOODBERRY
BY
ATTORNEYS

United States Patent Office 3,271,119
Patented Sept. 6, 1966

3,271,119
FOAMED PLASTIC STRUCTURE HAVING A UNIFORM CONTINUOUS METAL COATING INTEGRALLY BONDED TO THE SURFACE THEREOF
Paul T. Woodberry, Reading, Mass., assignor to the United States of America as represented by the Secretary of the Air Force
Filed Mar. 13, 1964, Ser. No. 351,874
2 Claims. (Cl. 29—191)

This invention relates to a structure or device which incorporates a foamed or cellular synthetic resinous material. More particularly, this invention relates to an improved preformed cellular plastic structure having a uniform continuous metal coating integrally bonded to the surface thereof.

Preformed structures of foamed plastic with a metal coating integrally bonded to the plastic surface have proved to be very useful when the properties of low density, relative high strength, insulation and decorative metal finish are required. Older methods of fabricating such structures include cementing a sheet metal or metal foil to the plastic base material. However, such methods have been found undesirable and even impossible to complete successfully in those situations where complex curved sections are to be coated. Further, such structures do not possess the requisite strength characteristics found to be necessary whenever these devices are utilized in load-bearing situations.

With the present invention, however, it has been discovered that complex curved sections of a foamed plastic, as well as a variety of other geometrical configurations, can be coated with a metallic film of predetermined thickness. The metal coated foamed plastic comprises a core having an internal hollow portion in which a suitable heat decomposable blowing agent has been placed. The completed structure can then be heated, whenever convenient, to decompose the included blowing agent. Decomposition of the blowing agent, within the plastic shell, places the metal enveloped plastic structure under internal pressure thereby effecting an increase in the relative strength of the device. Utilization of a spherical configuration for the composite structure produces a load-bearing device of great strength and utility as, for example, a core member for golf balls.

Accordingly, it is a primary object of this invention to provide a composite load-bearing structure comprising an internally pressurized foamed palstic shell with a metal coating integrally bonded to the outer surface of the shell.

A further object of this invention is to provide a load-bearing structure characterized by low density, and relative high strength.

The above and still further objects and advantages of this invention will become readily apparent upon consideration of the following description of a preferred embodiment thereof taken in connection with the accompanying drawing wherein the figure represents a cross-sectional view of a spherical type structure produced in accordance with the teachings of this invention.

The present invention is based upon the discovery that a light weight load-bearing structure of relatively high strength is obtained by forming a foamed plastic hollow shell with a blowing agent positioned within the interior of the hollow portion. A foamable plastic material is placed in a mold having a desired configuration such as a hollow sphere. The plastic is molded to the desired shape by heat and pressure and allowed to foam up to constitute a cellular mass that becomes rigid upon setting and curing.

After curing, the foamed plastic spherical shell is removed from the mold, a hole is drilled through the surface of the shell in order to allow for the insertion of the blowing agent and the hole is then resealed. Alternatively, the spherical shell could be cut into half sections and then resealed to reform the spherical shell after placing the blowing agent within the interior hollow portion.

The plastic shell or core may be formed from any suitable synthetic resinous material which is light in weight, possesses low density and good physical strength characteristics. A foamed insitu reaction product of a polyisocyanate and a suitable polyester of alkyd resinous composition may be utilized. For example, a meta-toluene diisocyanate is suitable. Polystyrene foam, however, is particularly advantageous since it is light in weight and highly porous with a specific gravity from about 1.65 to 2.0 pounds per cu. ft. It has an indicated porosity of from about 85 to 90 percent, resists the chemical action of acids and alkali, and is a commercial product sold under the trade name "Styrofoam."

Any suitable chemical blowing agent which will decompose upon heating to form a harmless gas, especially nitrogen, may be employed in making the device of this invention, examples being alpha, alpha'-azobisisobutyronitrile, diazoaminobenzene, dinitrosopentamethylenetetramine, benzenesulfonephenylazide, etc. Selection of the particular blowing agent and the amount employed are within the skill of the art. The amount used is adjusted in accordance with the predetermined size of the final structure in order to produce the desired amount of internal pressurization.

The plastic shell containing the blowing agent is next coated with a compatible latex coating by dipping, or some other suitable method, and allowed to dry. Care is exercised at this point not to use heat to such an extent as to decompose the blowing agent. Either a natural hevea rubber latex or a synthetic latex may be employed. A suitable synthetic latex may be chosen from any of the well-known synthetic rubbers such as a butadiene-styrene, butadiene-acrylonitrile or butadiene-isobutylene copolymer. After coating with latex, the structure is then provided with an adherent intermediate layer of a suitable conductive material in order to make the structure electrically conductive. A thin layer of either silver, copper, cadmium or graphite can be painted, blown onto, or otherwise applied to the latex coating of the structure.

A metallic layer is thereafter plated on the electrically conductive surface by electro-deposition. Different metals may be used for electroplating the base structure such as nickel, zinc, copper, cadmium, etc. In the electroplating process, particularly at the beginning, very low current densities should be employed. After an initial plating has been deposited the current can be increased and the deposit encouraged by the application of mild heat and agitation in accordance with well-known electroplating procedures. The use of a chemical reduction or electroless plating process, such as electroless nickel or electroless copper, may also be utilized for plating the conductive surface.

A metallic layer of nickel has proved to be preferable for plating the electrically conductive surface. This may be applied from a suitable nickel plating solution such as a nickel sulfamate, nickel chloride, boric acid bath; a typical single bath comprising nickel sulphate, nickel chloride, and boric acid; or a typical double bath comprising nickel ammonium sulphate, nickel sulphate, sodium chloride, and boric acid. Cathode current densities from $2 \times 10^{-2}$ to $8 \times 10^{-2}$ amp./cm.$^2$ are generally utilized to produce the desired plating thickness.

Referring to the drawing there is disclosed a preferred embodiment of the load-bearing structure produced by this invention. In the interests of clarity, the thickness of the coatings has been exaggerated. The structure is fabricated from a hollow sperical shell of foamed polystyrene 10 approximately ½ inch thick in cross-section and coated with an intermediate layer 12 of natural rubber latex. Adherently bonded to the intermediate layer 12 is a coating 14 of an electrically conductive silver paint composed of a metallic silver powder in a suitable volatile carrier and adhesive such as is disclosed in the publication "Metallizing Nonconductors" by Samuel Wein, published by Metal Industry Publishing Company (1945). Other electrically conductive metals may also be utilized such as Du Pont Silver Paint No. 4817 from the E. I. du Pont de Nemours Company, Inc. Integrally bonded to the composite structure is a uniform continuous coating 16 of nickel plate deposited by electrodeposition. The thickness of the plate is about 0.04 inch; but a lesser or greater thickness may be obtained by ranging the plating time and the cathode current density. As a result, the composite structure is covered with a uniform, fairly smooth plate of nickel. Positioned within the hollow sphere 12 is a decomposable blowing agent 18 in pelletized form.

The completed structure, as shown in the drawing, can then be heated at any convenient time in order to decompose the blowing agent and effect internal pressurization of the composite structure.

Inserts of metal or plastic may be placed in the foamed plastic shell for additional strength. Also, indentations of the plastic shell may be made to decrease weight.

From the foregoing description, it will be seen that this invention provides a novel structure characterized by low density, light weight, and relative high strength which is particularly adapted for use in load-bearing situations. The nickel plated coating provides the structure with protection against heat, solvents and external pressures, as well as providing a protective envelope for maintaining the internal pressurization to which the structure is subjected. The device has far greater dimensional stability than a similar foamed structure not possessing internal pressurization or an outer protective metal coating. The metal coating protects the core against failure by reason of its tough nature and the tenaciousness with which it is adherent to the plastic core.

Although the embodiment disclosed in the preceding specification is preferred, other modifications will be apparent to those skilled in the art which do not depart from the broadest aspects of the scope of the invention.

What is claimed is:

1. A load-bearing structure comprising an inner core member of a rigid foamed plastic and having a hollow portion, a heat decomposable blowing agent positioned within the hollow portion of said core member, an intermediate layer of latex rubber bonded to the outer surface of said core member, an electrically conductive coating adhesively bonded to said intermediate layer, and a layer of electrodeposited metal integrally bonded to said conductive coating to form a unitary structure.

2. A load-bearing structure comprising an inner core member of a rigid foamed plastic and having a hollow portion, a heat decomposed blowing agent positioned within the hollow portion of said core member, an intermediate layer of latex rubber bonded to the outer surface of said core member, an electrically conductive coating adhesively bonded to said intermediate layer, and a layer of electrodeposited metal integrally bonded to said conductive coating to form an internally pressurized structure.

References Cited by the Examiner

UNITED STATES PATENTS

| | | | |
|---|---|---|---|
| 1,752,735 | 4/1930 | Gammeter | 156—146 |
| 3,179,575 | 4/1965 | Dippel et al. | 29—195 |
| 3,218,255 | 11/1965 | Pratt | 29—195 |

DAVID L. RECK, *Primary Examiner.*

R. O. DEAN, *Assistant Examiner.*